United States Patent
Liu et al.

(10) Patent No.: US 12,129,566 B2
(45) Date of Patent: Oct. 29, 2024

(54) METHOD FOR PREPARING HYDROGEN SULFIDE FROM SULFUR DIOXIDE BY ELECTROCHEMICAL REDUCTION

(71) Applicant: CENTRAL SOUTH UNIVERSITY, Changsha (CN)

(72) Inventors: Hui Liu, Changsha (CN); Kaisong Xiang, Changsha (CN); Liyuan Chai, Changsha (CN); Fenghua Shen, Changsha (CN); Xudong Liu, Changsha (CN); Fangfang Zhu, Changsha (CN); Lin Wu, Changsha (CN); Huimin Yi, Changsha (CN); Xiaobo Min, Changsha (CN); Zhang Lin, Changsha (CN); Qingzhu Li, Changsha (CN); Qingwei Wang, Changsha (CN); Haiying Wang, Changsha (CN); Weichun Yang, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 331 days.

(21) Appl. No.: 17/707,903

(22) Filed: Mar. 29, 2022

(65) Prior Publication Data

US 2022/0316078 A1 Oct. 6, 2022

(30) Foreign Application Priority Data

Mar. 31, 2021 (CN) .......................... 202110343864.3

(51) Int. Cl.
C25B 9/23 (2021.01)
B01D 53/50 (2006.01)
B01D 53/78 (2006.01)
C25B 1/01 (2021.01)
C25B 1/50 (2021.01)
C25B 11/052 (2021.01)
C25B 11/057 (2021.01)
C25B 11/075 (2021.01)
C25B 11/081 (2021.01)
C25B 15/08 (2006.01)

(52) U.S. Cl.
CPC .............. *C25B 9/23* (2021.01); *B01D 53/502* (2013.01); *B01D 53/78* (2013.01); *C25B 1/01* (2021.01); *C25B 1/50* (2021.01); *C25B 11/052* (2021.01); *C25B 11/057* (2021.01); *C25B 11/075* (2021.01); *C25B 11/081* (2021.01); *C25B 15/08* (2013.01); *B01D 2251/306* (2013.01); *B01D 2251/604* (2013.01)

(58) Field of Classification Search
CPC .... C25B 1/01; C25B 1/00; C25B 1/50; C25B 1/22; C25B 9/17; C25B 9/19; C25B 9/23; C25B 9/21

See application file for complete search history.

(56) References Cited

U.S. PATENT DOCUMENTS

| | | | |
|---|---|---|---|
| 2011/0180417 A1* | 7/2011 | Steimke | C25B 1/02 205/337 |
| 2019/0226103 A1* | 7/2019 | Kuhl | C25B 1/04 |
| 2019/0376189 A1* | 12/2019 | Tarabukin | C25B 13/04 |
| 2019/0376191 A1 | 12/2019 | Finke | |

FOREIGN PATENT DOCUMENTS

| | | |
|---|---|---|
| CN | 110203890 A | 9/2019 |
| CN | 111362330 A | 7/2020 |
| CN | 111593363 A | 8/2020 |
| DE | 19718923 A1 | 10/1998 |

OTHER PUBLICATIONS

J.P. Fornés, et al., Cathode depassivation using ultrasound for the production of colloidal sulphur by reduction of sulphur dioxide, Electrochimica Acta, 2016, pp. 186-193, vol. 213.
Zhang Zheng-Yang, et al., Research Progress in Electrochemical Treatment of Sulfur Dioxide, Nonferrous Metals (Extractive Metallurgy), 2020, pp. 1-7.
Elizabeth A. Paul, et al., Electrocatalytic Reduction of Sulfuric Acid to Hydrogen Sulfide by a Trinuclear Niobium Cluster, Inorganic Chemistry, 1994, pp. 630-631, vol. 33, No. 4.
C. Quijada, et al., Electrochemical behaviour of aqueous SO2 at polycrystalline gold electrodes in acidic media: a voltammetric and in situ vibrational study Part 1. Reduction of SO2: deposition of monomeric and polymeric sulphur, Electrochimica Acta, 2000, pp. 1847-1862, vol. 45.

* cited by examiner

*Primary Examiner* — Brian W Cohen
(74) *Attorney, Agent, or Firm* — Bayramoglu Law Offices LLC

(57) ABSTRACT

A method for preparing hydrogen sulfide from sulfur dioxide by electrochemical reduction includes electrochemically reducing sulfur dioxide absorbed in an aqueous solution into gaseous hydrogen sulfide with a membrane electrode, resulting in efficient and selective conversion of the sulfur dioxide absorbed in the aqueous solution into the hydrogen sulfide to avoid a deactivation of a cathode due to colloidal sulfur produced on the cathode and adhesion onto a surface of the cathode, wherein the method is carried out at ambient temperature and normal pressure without addition of a reducing agent, having no waste salts produced, and is simple in operation, and is convenient for large-scale application.

20 Claims, No Drawings

METHOD FOR PREPARING HYDROGEN SULFIDE FROM SULFUR DIOXIDE BY ELECTROCHEMICAL REDUCTION

CROSS REFERENCE TO THE RELATED APPLICATIONS

This application is based upon and claims priority to Chinese Patent Application No. 202110343864.3, filed on Mar. 31, 2021, the entire contents of which are incorporated herein by reference.

TECHNICAL FIELD

The present invention relates to a method for recycling sulfur dioxide from flue gas, and in particular, to a method for highly selective conversion of metallurgical $SO_2$ flue gas into more economical hydrogen sulfide by electrochemical reduction, which belongs to the field of industrial flue gas recycling.

BACKGROUND

With the increasingly stringent requirements for environmental protection, a large amount of $SO_2$ produced by nonferrous metallurgy is in urgent need of recycling. At present, the main method for recycling $SO_2$ is to prepare sulfuric acid. Although sulfuric acid is a bulk industrial product, it is also a hazardous material, which is inconvenient for storage and transportation. Therefore, the poor sale of sulfuric acid becomes a major problem faced by enterprises. Hydrogen sulfide is a widely used chemical product. The reduction of $SO_2$ into $H_2S$ can not only be directly used for the treatment of heavy metal wastewater in smelters, but also can subject $H_2S$ to reaction with $SO_2$ by using a Claus equipment to produce high-quality sulfur, which can deal with excess sulfuric acid.

The current methods for producing hydrogen sulfide mainly include cascade reduction, addition of acid to sulfide, and the like. The Chinese patent (with an Application No. CN202010214975.X) discloses a method for preparing hydrogen sulfide by cascade reduction of sulfur dioxide, including catalytically reducing sulfur dioxide into sulfur vapor, which mixed with natural gas to be secondarily reduced into a gas mixture of carbon disulfide, hydrogen sulfide, and carbon dioxide, and then catalytically hydrolyzing the gas mixture into hydrogen sulfide. This method requires a high temperature of 200-500° C., and obtains various reaction products that are difficult to purify. The Chinese patent (with an Application No. CN201910526382.4) discloses a method for preparing $H_2S$ with CaS and dilute $H_2SO_4$ as raw materials through pH adjustment, carburetion, solid-liquid separation, roasting, dilute $H_2SO_4$ preparation, and other procedures. This method requires a long overall process, produces a large amount of waste salt, and consumes a large amount of industrial chemical raw materials, which is high in costs and is not conducive to large-scale production. The Chinese patent (CN111593363A) discloses a method for electrocatalytically reducing sulfur dioxide with a lead electrode. This method can produce sulfur as a main product with a small amount of hydrogen sulfide, which is not high-efficiency in hydrogen sulfide conversion, and prone to electrode inactivation by the sulfur.

SUMMARY

In view of deficiencies in the prior art, an objective of the present invention is to provide a method for obtaining hydrogen sulfide by directly electrochemically reducing sulfur dioxide with a membrane electrode. This method can achieve highly efficient and selective reduction for obtaining hydrogen sulfide, thereby avoiding cathode deactivation due to colloidal sulfur produced on the cathode. In addition, this method can be carried out under mild conditions of room temperature and atmospheric pressure, is low in energy consumption, simple in operation, and environmentally friendly in process, and is conducive to large-scale popularization and application, which provides a new way for the recovery of sulfur from sulfur dioxide from flue gas.

To achieve the foregoing technical objective, the present invention provides a method for preparing hydrogen sulfide from sulfur dioxide by electrochemical reduction, including electrochemically reducing sulfur dioxide absorbed in an aqueous solution into gaseous hydrogen sulfide with a membrane electrode, where the membrane electrode is a porous membrane with catalytic function.

The technical solution of the present invention can carry out highly selective reduction on sulfur dioxide absorbed in an aqueous solution into gaseous hydrogen sulfide to avoid the production of elemental sulfur on the cathode, which can resolve the technical problem of cathode deactivation due to the elemental sulfur adhesion onto the surface of the cathode. The key to the method of the present invention is the membrane electrode with a porous structure.

The intermediate state of hydrogen sulfide produced during electrochemical reduction of the sulfur dioxide absorbed in an aqueous solution can be quickly and selectively separated by the membrane electrode to promote the entire electrochemical reduction to carry out in the direction that is conducive to the formation of hydrogen sulfide. Therefore, the Faraday efficiency of hydrogen sulfide is increased, and there is almost no elemental sulfur produced during the entire electrochemical reduction. The membrane electrode with a porous structure has a large specific surface area to support a catalyst, so that more catalytic active sites can be exposed, which has higher catalytic activity than a general bulk electrode.

As a preferred solution, the porous membrane with catalytic function is composed of a porous hydrophobic membrane substrate and at least one of elemental metals, metal sulfides, and metal selenides as catalytic materials supported on the surface of the substrate, or is composed of a material with catalytic and surface hydrophobic functions.

As a preferred solution, the porous hydrophobic membrane substrate is a porous hydrophobic material or a porous material with surface hydrophobic treatment. The porous hydrophobic material may be composed of hydrophobic polymer materials or hydrophobic inorganic non-metallic materials. The porous material with surface hydrophobic treatment is a porous material with the surface modification by hydrophobic macromolecules (such as PTFE) or hydrophobic micromolecules (such as biowax, and octadecanethiol). For example, the hydrophobic porous material is obtained by soaking copper foam (a pore size of 0.1 mm) in an ethyl acetate solution with 1% v/v octadecanethiol for 1-5 min and then air drying. The porous material with surface hydrophobic treatment is a porous material with a hydrophobic surface processed on a micro-nano scale. For example, the porous material is obtained by anodizing copper foam with a pore size of 0.1 mm in 3 mol/L of potassium hydroxide solution to construct a needle-like nanoarray with a length of about 2 μm in situ to make the surface hydrophobic. The hydrophobic material is selected based on the good affinity with hydrogen sulfide and the capability to avoid electrolyte penetration, allowing hydrogen sulfide to pass through with high selectivity and strengthens the separation of the electrolyte and the hydrogen sulfide. Preferably, the hydrophobic polymer material is selected from PTFE, PEEK, PP, PE, or the like. Preferably, the hydrophobic inorganic non-metallic material is a carbon material. Specifically, common PTFE porous membranes, PEEK porous membranes, PP porous membranes, PE porous membranes, carbon cloth, or porous carbon paper commonly available on the market may be used as the porous membrane substrate. The porous structure on the surface of the porous membrane substrate allows hydrogen sulfide to pass through, but not the electrolyte. The porous material substrate in the porous material with surface hydrophobic treatment may be a metal material, a polymer material, or an inorganic non-metallic material, such as copper foam, nickel foam, or PEEK.

As a preferred solution, the elemental metal is at least one selected from a group consisting of lead, copper, cobalt, iron, nickel, gold, silver, platinum, or palladium.

As a preferred solution, the metal sulfide is at least one selected from a group consisting of sulfides of lead, copper, cobalt, iron, nickel, gold, silver, platinum, or palladium.

As a preferred solution, the metal selenide is at least one selected from a group consisting of selenides of lead, copper, cobalt, iron, nickel, gold, silver, platinum, or palladium. The common transition metals and sulfides or selenides thereof in the art basically have the activity of electrocatalytic reduction of the sulfur dioxide absorbed in an aqueous solution.

As a preferred solution, the material with catalytic and surface hydrophobic functions is carbon cloth or porous carbon paper, or is a porous metal material with surface hydrophobic treatment. For example, the carbon cloth or porous carbon paper has the catalytic and hydrophobic functions, so that it can be used as the membrane electrode. The porous metal material with surface hydrophobic treatment is a porous material with the surface modified by hydrophobic macromolecules (such as PTFE) or hydrophobic micromolecules (such as biowax, and octadecanethiol), or is a porous material with a hydrophobic surface processed in a micro-nano scale. The porous metal material is composed of lead, copper, cobalt, iron, nickel, gold, silver, platinum, or palladium.

As a preferred solution, the electrochemical reduction of the sulfur dioxide absorbed in an aqueous solution is carried out by using a three-electrode system with the aqueous solution absorbed with sulfur dioxide as a cathode compartment electrolyte and the membrane electrode as a working electrode. As a further preferred solution, the three-electrode system for electrochemical reduction of the sulfur dioxide absorbed in an aqueous solution is composed of the aqueous solution absorbed with sulfur dioxide as the cathode compartment electrolyte, the membrane electrode as the working electrode, a metal-based or carbon electrode as the counter electrode, and a $Hg/Hg_2SO_4$ electrode as the reference electrode. An electrode composed of platinum, graphite, nickel, iridium oxide, or the like may be used as the counter electrode. The electrolyte in the cathode compartment is not limited. The common electrolytes in the industry, such as a $Na_2SO_4/H_2SO_4$ mixed solution, basically meet the requirements.

As a preferred solution, the aqueous solution absorbed with sulfur dioxide is obtained by absorbing sulfur dioxide into lye or water, or is obtained by injecting sulfur dioxide microbubbles into an acid electrolyte (pH<7). The common lyes include ammonia water, sodium hydroxide solution, potassium hydroxide solution, and the like. The water absorption solution of sulfur dioxide is mainly $H_2SO_3$ solution, and the lye absorption solution of sulfur dioxide includes an ammonium sulfite solution, a potassium sulfite solution, a sodium sulfite solution, etc., which are all suitable for the technical solution of the present invention. The concentration of the aqueous solution absorbed with sulfur dioxide is not limited. The sulfur dioxide may be enriched high-concentration sulfur dioxide gas, or sulfur dioxide in flue gas.

As a preferred solution, the pH of the aqueous solution absorbed with sulfur dioxide is adjusted to be less than 5 during the electrochemical reduction. The acidic environment of the electrolyte is conducive to the formation of hydrogen sulfide.

As a preferred solution, the potential of the working electrode is controlled to −0.1 V to −2.0 V (versus $Hg/Hg_2SO_4$ reference electrode) during the electrochemical reduction.

The membrane electrode involved in the present invention is prepared by the following method. A membrane material with hydrophobic and catalytic functions purchased directly from the market, such as carbon paper or carbon cloth, may be directly used as the membrane electrode. Alternatively, metal material with a porous or mesh structure after the surface modification by hydrophobic treatment (modified by hydrophobic macromolecules or fabricate hydrophobic structure on the surface in a micro-nano scale) is used as the membrane electrode. Alternatively, a porous polymer membrane (mesh) material, carbon fiber cloth, or porous carbon paper with hydrophobic function purchased directly from the market is used as the porous membrane substrate, or a porous material with surface hydrophobic treatment (modified by hydrophobic macromolecules or fabricated surface with micro-nano scale hydrophobic structure) is used as the porous membrane substrate, and a catalytic coating layer is formed on the surface of the porous membrane substrate by electroplating, chemical plating, spraying, magnetron sputtering, vapor deposition, or atomic layer deposition, so that the membrane electrode with catalytic coating on the surface of the porous membrane substrate is obtained. The preparation of Au/PTFE membrane electrode is used as an example for description of metal coating. The Au catalyst is supported on a porous membrane substrate by magnetron sputtering with specific parameters: vacuum level below $1.3\times10^{-4}$ Pa, sputtering rate 8000 Å/min to 10000 Å/min, substrate temperature 150° C., cathode voltage 420 V (between 300 V and 600 V), electric current 13 A, sputtering vacuum level 0.13-1.3 Pa, and sputtering time 5-10 min. (Membrane electrodes with metals as active materials can be obtained with reference to this method). The preparation of $Co_xS_y/C$ membrane electrode is used as an example for description of metal sulfides coating. A Co/C membrane electrode can be prepared with reference to the foregoing metal coating method, and the Co/C membrane electrode then undergoes sulfidation at high temperature. The specific sulfidation process is as follows. The Co/C membrane electrode and sulfur are placed in a sealed tube furnace and vacuumized to below 10 Pa, argon gas is introduced to an atmospheric pressure, the temperature is increased to 900° C. by 10° C./min and is kept for 20-60 min, and then naturally cooled to room temperature under argon atmosphere, to obtain the $Co_xS_y/C$ membrane electrode. (Membrane electrodes with metal selenides or metal sulfides as active materials and with carbon fiber cloth or porous carbon paper as porous membrane substrates can be obtained with reference to this method). Alternatively, the $Co_xS_y$ active material is directly dispersed in a solvent to form ink, and the $Co_xS_y$ is loaded on the surface of the porous membrane substrate by spraying the ink and then dried, to obtain the $Co_xS_y/C$ membrane electrode. (Membrane electrodes with metal selenides or metal sulfides as active materials can be obtained with reference to this method).

Compared with the prior art, the technical solution of the present invention has the following beneficial technical effects.

1. Compared with the prior art where electrolysis is carried out with a plate electrode such as lead, titanium, copper, or glassy carbon as a working electrode to obtain elemental sulfur as a main reduction product, the technical solution of the present invention uses a membrane electrode for the first time to achieve the highly selective electrocatalytic reduction of sulfur dioxide into gaseous hydrogen sulfide, which has higher added-value in application.

2. The technical solution of the present invention uses a membrane electrode with a porous structure and high catalytic activity to achieve the electrochemical reduction of sulfur dioxide absorbed in an aqueous solution, meanwhile hydrogen sulfide produced during the reduction can be quickly and selectively separated from the electrolyte to promote the target electrochemical reduction, thereby increasing the Faraday efficiency and purity of hydrogen sulfide.

3. In the technical solution of the present invention, efficient conversion of sulfur dioxide can be achieved at room temperature and atmospheric pressure, the Faraday efficiency of hydrogen sulfide can reach 95% or more, and there are no sulfur products to deactivate the electrode during reduction, which can maintain long-term catalytic stability. The present invention has mild reaction conditions and low energy consumption, which is conducive to industrial application. The reaction requires no other chemical reagents and produces no waste salt, which has significant advantages in environmental protection.

DETAILED DESCRIPTION OF THE EMBODIMENTS

The following examples are used to further illustrate the present invention, but not to limit the protection scope of the claims of the present invention.

In the following examples, sulfur dioxide absorbed in an aqueous solution was electrochemically reduced by using a three-electrode system, the cathode and anode compartments of the three-electrode system were separated by the DuPont N117 proton exchange membrane, the electrolyte in the cathode compartment was a sodium hydroxide solution absorbing sulfur dioxide, the electrolyte in the anode compartment was a $Na_2SO_4/H_2SO_4$ mixed solution, a membrane electrode was used as a working electrode, Pt was used as a counter electrode, $Hg/Hg_2SO_4$ was used as a reference electrode, and a reduction potential may be –1.2 V to –1.8 V (vs SCE).

The preparation of Au/PTFE membrane electrode in the following examples was as follows. An Au catalyst was supported on a PTFE porous membrane (commodity raw material purchased directly) substrate by magnetron sputtering with specific parameters: vacuum level below $1.3 \times 10^{-4}$ Pa, sputtering rate 10000 Å/min, substrate temperature 150° C., cathode voltage 420 V, electric current 13 A, sputtering vacuum 1 Pa, and sputtering time 6 min.

The preparation of $CoS_2$/PTFE membrane electrode in the following examples was as follows. $CoS_2$ and carbon black was directly dispersed in an ethanol solvent to form an ink with a concentration of 10% w/w, the ink was loaded on the surface of the PTFE porous membrane substrate by spraying in 1 $mg/cm^2$ and then dried, to obtain the $CoS_2$/PTFE membrane electrode.

The preparation of hydrophobic carbon paper in the following examples was as follows. Carbon paper was soaked in an ethyl acetate solution with 1% v/v octadecanethiol for 4 min and then air dried.

In the following examples, unless otherwise specified, the chemical reagents used are all conventional commercially available analytical reagents.

Comparative Example 1

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was no hydrogen sulfide produced after electrolysis was carried out with the reduction potential of –0.8 V using the Au/PTFE membrane electrode as the working electrode. It indicates from the comparative example that there is no hydrogen sulfide produced with the reduction potential of –0.8 V.

Example 1

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was hydrogen sulfide produced with a Faraday efficiency of 99.56% after electrolysis was carried out with the voltage of –1.2 V using the Au/PTFE membrane electrode as the working electrode.

Example 2

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was hydrogen sulfide produced with a Faraday efficiency of 97.93% after electrolysis was carried out with the reduction potential of –1.4 V using the Au/PTFE membrane electrode as the working electrode.

Example 3

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was hydrogen sulfide produced with a Faraday efficiency of 89.93% after electrolysis was carried out with the reduction potential of –1.6 V using the Au/PTFE membrane electrode as the working electrode.

Example 4

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was hydrogen sulfide produced with a Faraday efficiency of 79.29% after electrolysis was carried out with the reduction potential of −1.8 V using the Au/PTFE membrane electrode as the working electrode.

Example 5

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.1 with sulfuric acid. There was hydrogen sulfide produced with a Faraday efficiency of 75.22% after electrolysis was carried out with the reduction potential of −1.4 V using the Au/PTFE membrane electrode as the working electrode.

Comparative Example 2

To show the advantages of hydrogen sulfide production with the Au/PTFE membrane electrode, the electrocatalytic performance of Au foil was tested under the same conditions.

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.1 with sulfuric acid. There were elemental sulfur produced with a Faraday efficiency of 80.11% and hydrogen sulfide produced with a Faraday efficiency of 4.85% after electrolysis was carried out with the reduction potential of −1.4 V using the Au foil as the working electrode.

Example 6

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was hydrogen sulfide produced with a Faraday efficiency of 95.30% after electrolysis was carried out with the reduction potential of −1.4 V using the hydrophobic carbon paper as the working electrode.

Example 7

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was hydrogen sulfide produced with a Faraday efficiency of 96.10% after electrolysis was carried out with the reduction potential of −1.4 V using the $CoS_2$/PTFE membrane electrode as the working electrode.

Example 8

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There was hydrogen sulfide produced with a Faraday efficiency of 92.50% after electrolysis was carried out with the reduction potential of −1.3 V using the copper-plated titanium fiber mesh after hydrophobic treatment as the working electrode.

Comparative Example 3

10 mL of aqueous solution absorbed with sulfur dioxide (with 0.1 mol/L of $SO_2$) was taken into the cathode compartment as the cathode electrolyte, 10 mL of aqueous sodium sulfate (0.1 mol/L) was used as the anode electrolyte, and the pH of the cathode and anode electrolytes was adjusted to 0.5 with sulfuric acid. There were sulfur mainly produced and hydrogen sulfide produced with a Faraday efficiency of 21.36% after electrolysis was carried out with the reduction potential of −1.3 V directly using the copper-plated titanium fiber mesh as the working electrode, and there was liquid seepage on the surface of the electrode during the electrolysis.

Example 9

The aqueous solution absorbed with sulfur dioxide (0.1 mol/L of $SO_2$) with pH=0.5 was used as the cathode electrolyte, and the aqueous sodium sulfate (0.1 mol/L) was used as the anode electrolyte. The Au/PTFE membrane electrode was used as the working electrode (7 cm×7 cm), and the Pt/C gas diffusion electrode was used as the counter electrode (7 cm×7 cm). $SO_2$ electrolysis was carried out by using a (10 cm×10 cm) flow electrolytic cell. An experimental bipolar membrane in the flow electrolytic cell was used as a membrane for separating the cathode and anode compartments. The distance between the bipolar membrane and the counter electrode was 0 mm, and the distance between the bipolar membrane and the working electrode was 1 mm. The circulation flow rate of the electrolytes in the cathode and anode compartments was 5 mL/min. At the working voltage of −1.4 V (versus reference electrode), the Faraday efficiency of hydrogen sulfide produced by electrolysis was 95.86%, the current density was 38.1 mA/cm$^2$, there was no attenuation after continuous electrolysis for 50 h, and the separation rate of hydrogen sulfide was 98.1%.

What is claimed is:

1. A method for preparing hydrogen sulfide from sulfur dioxide by an electrochemical reduction, comprising electrochemically reducing the sulfur dioxide absorbed in an aqueous solution into gaseous hydrogen sulfide with a membrane electrode, wherein the membrane electrode is a porous membrane with a catalytic function for $SO_2$ conversion and separation function for $H_2S$ gas products, wherein the electrochemical reduction of the sulfur dioxide absorbed in the aqueous solution is carried out by using a three-electrode system with the aqueous solution absorbed with the sulfur dioxide as a cathode compartment electrolyte and the membrane electrode as a working electrode.

2. The method according to claim 1, wherein the porous membrane with the catalytic function is composed of a porous hydrophobic membrane substrate and at least one of elemental metal, metal sulfide, and metal selenide as catalytic materials supported on a surface of the porous hydrophobic membrane substrate, or the porous membrane with the catalytic function is composed of a material with the catalytic function and a surface hydrophobic function.

3. The method according to claim 2, wherein
the porous hydrophobic membrane substrate is composed of a porous hydrophobic material, or is composed of a porous material with a surface hydrophobic treatment;
the elemental metal is at least one selected from the group consisting of lead, copper, cobalt, iron, nickel, gold, silver, platinum, and palladium;
the metal sulfide is at least one selected from the group consisting of lead sulfide, copper sulfide, cobalt sulfide, iron sulfide, nickel sulfide, gold sulfide, silver sulfide, platinum sulfide, and palladium sulfide; and
the metal selenide is at least one selected from the group consisting of lead selenide, copper selenide, cobalt selenide, iron selenide, nickel selenide, gold selenide, silver selenide, platinum selenide, and palladium selenide.

4. The method according to claim 3, wherein
the porous hydrophobic material is at least one selected from the group consisting of polytetrafluoroethylene (PTFE), polyether ether ketone (PEEK), polypropylene (PP), polyethylene (PE), a carbon cloth, and a porous carbon paper; and
the porous material with the surface hydrophobic treatment is a porous material with a surface modified by hydrophobic macromolecules or hydrophobic micromolecules, or is a porous material with a hydrophobic surface processed in a micro-nano scale.

5. The method according to claim 2, wherein the material with the catalytic function and the surface hydrophobic function is a carbon cloth, a porous carbon paper, or a porous metal material with a surface hydrophobic treatment.

6. The method according to claim 1, wherein the aqueous solution absorbed with the sulfur dioxide is obtained by absorbing the sulfur dioxide into lye or water, or the aqueous solution absorbed with the sulfur dioxide is obtained by injecting sulfur dioxide microbubbles into an acid electrolyte.

7. The method according to claim 1, wherein a pH of the aqueous solution absorbed with the sulfur dioxide is adjusted to be less than 5 during the electrochemical reduction.

8. The method according to claim 1, wherein a potential of the working electrode is controlled to $-0.1$ V to $-2.0$ V versus a reference electrode during the electrochemical reduction.

9. A method for preparing hydrogen sulfide from sulfur dioxide by an electrochemical reduction, comprising electrochemically reducing the sulfur dioxide absorbed in an aqueous solution into gaseous hydrogen sulfide with a membrane electrode, wherein the membrane electrode is a porous membrane with a catalytic function, wherein a pH of the aqueous solution absorbed with the sulfur dioxide is adjusted to be less than 5 during the electrochemical reduction.

10. The method according to claim 9, wherein the porous membrane with the catalytic function is composed of a porous hydrophobic membrane substrate and at least one of elemental metal, metal sulfide, and metal selenide as catalytic materials supported on a surface of the porous hydrophobic membrane substrate, or the porous membrane with the catalytic function is composed of a material with the catalytic function and a surface hydrophobic function.

11. The method according to claim 10, wherein the porous hydrophobic membrane substrate is composed of a porous hydrophobic material, or is composed of a porous material with a surface hydrophobic treatment;
the elemental metal is at least one selected from the group consisting of lead, copper, cobalt, iron, nickel, gold, silver, platinum, and palladium;
the metal sulfide is at least one selected from the group consisting of lead sulfide, copper sulfide, cobalt sulfide, iron sulfide, nickel sulfide, gold sulfide, silver sulfide, platinum sulfide, and palladium sulfide; and
the metal selenide is at least one selected from the group consisting of lead selenide, copper selenide, cobalt selenide, iron selenide, nickel selenide, gold selenide, silver selenide, platinum selenide, and palladium selenide.

12. The method according to claim 11, wherein
the porous hydrophobic material is at least one selected from the group consisting of polytetrafluoroethylene (PTFE), polyether ether ketone (PEEK), polypropylene (PP), polyethylene (PE), a carbon cloth, and
a porous carbon paper; and the porous material with the surface hydrophobic treatment is a porous material with a surface modified by hydrophobic macromolecules or hydrophobic micromolecules, or is a porous material with a hydrophobic surface processed in a micro-nano scale.

13. The method according to claim 10, wherein
the material with the catalytic function and the surface hydrophobic function is a carbon cloth, a porous carbon paper, or a porous metal material with a surface hydrophobic treatment.

14. The method according to claim 9, wherein the aqueous solution absorbed with the sulfur dioxide is obtained by absorbing the sulfur dioxide into lye or water, or the aqueous solution absorbed with the sulfur dioxide is obtained by injecting sulfur dioxide microbubbles into an acid electrolyte.

15. The method according to claim 9, wherein the electrochemical reduction of the sulfur dioxide absorbed in the aqueous solution is carried out by using a three-electrode system with the aqueous solution absorbed with the sulfur dioxide as a cathode compartment electrolyte and the membrane electrode as a working electrode and a potential of the working electrode is controlled to $-0.1$ V to $-2.0$ V versus a reference electrode during the electrochemical reduction.

16. The method according to claim 10, wherein the electrochemical reduction of the sulfur dioxide absorbed in the aqueous solution is carried out by using a three-electrode system with the aqueous solution absorbed with the sulfur dioxide as a cathode compartment electrolyte and the membrane electrode as a working electrode.

17. The method according to claim 11, wherein the electrochemical reduction of the sulfur dioxide absorbed in the aqueous solution is carried out by using a three-electrode system with the aqueous solution absorbed with the sulfur dioxide as a cathode compartment electrolyte and the membrane electrode as a working electrode.

18. The method according to claim 12, wherein the electrochemical reduction of the sulfur dioxide absorbed in the aqueous solution is carried out by using a three-electrode system with the aqueous solution absorbed with the sulfur dioxide as a cathode compartment electrolyte and the membrane electrode as a working electrode.

19. The method according to claim 13, wherein the electrochemical reduction of the sulfur dioxide absorbed in the aqueous solution is carried out by using a three-electrode system with the aqueous solution absorbed with the sulfur dioxide as a cathode compartment electrolyte and the membrane electrode as a working electrode.

20. The method according to claim 9, wherein the electrochemical reduction of the sulfur dioxide absorbed in the aqueous solution is carried out by using a three-electrode system with the aqueous solution absorbed with the sulfur dioxide as a cathode compartment electrolyte and the membrane electrode as a working electrode and the aqueous solution absorbed with the sulfur dioxide is obtained by absorbing the sulfur dioxide into lye or water, or the aqueous solution absorbed with the sulfur dioxide is obtained by injecting sulfur dioxide microbubbles into an acid electrolyte.

\* \* \* \* \*